United States Patent

[11] 3,522,760

| [72] | Inventor: | Thomas H. Putman <br> Penn Hills, Pittsburgh, Pennsylvania |
|---|---|---|
| [21] | Application No.: | 747,198 |
| [22] | Filed: | July 24, 1968 |
| [45] | Patented: | Aug. 4, 1970 |
| [73] | Assignee: | Westinghouse Electric Corporation <br> Pittsburgh, Pennsylvania <br> a Corp. of Pennsylvania |

[54] HYDRAULIC PISTON
1 Claim, Drawing Fig.

[52] U.S. Cl. .................................................. 92/127,
92/152, 92/172, 92/175
[51] Int. Cl. .................................................... F01b 31/00,
F01b 7/00, F16j 1/00
[50] Field of Search ................................................... 92/86,
126, 127, 152, 151, 162, 174, 175, 172

[56] References Cited
UNITED STATES PATENTS

| 422,051 | 2/1890 | Drautz ..................... | 92/152X |
| 2,623,501 | 12/1952 | Audemar ................. | 92/127UXR |
| 2,819,935 | 1/1958 | Grad ....................... | 92/152X |
| 2,833,602 | 5/1958 | Bayer ...................... | 92/127 |
| 3,035,879 | 5/1962 | Hanny, et al ............ | 92/162X |
| 3,285,142 | 11/1966 | Doll, et al ................ | 92/162X |

FOREIGN PATENTS

| 877,518 | 5/1953 | Germany, West <br> Vogel | 92/172 |

Primary Examiner— Martin P. Schwadron
Assistant Examiner— Irwin C. Cohen
Attorney— F. H. Henson and F. E. Blake ABSTRACT: A substantially frictionless self-centering hydraulic piston for developing a force that may be resisted by a force that is applied displaced from the piston axis comprising at least two aligned cylinder sections with a piston having first and second spaced apart and connected piston sections complementary therein, at least one of the walls between each piston and cylinder section being tapered to provide a piston end with maximum clearance and a piston end with minimum clearance, together with means to apply fluid pressure to both piston ends of maximum clearance.

Patented Aug. 4, 1970 3,522,760

WITNESSES:
Bernard R. Gieguay
James F. Young

INVENTOR
Thomas H. Putman
BY
ATTORNEY

U.S. PATENT 3,522,760
HYDRAULIC PISTON

CROSS REFERENCES TO RELATED APPLICATIONS

A related invention is described in the copending patent application Serial No. 771,713 filed October 30, 1968 assigned to the same assignee as the present invention.

BACKGROUND OF THE INVENTION

Hydraulic pistons for doing work are of course well known and in most instances the friction between the piston and cylinder walls can be ignored. It has been found however, that in certain applications, the amount of friction between the piston and cylinder walls is objectionable. For example, submarine thrust bearings conventionally employ a plurality of hydraulic pistons to absorb the propeller thrust and these thrust forces are often applied offset or displaced from each of the piston axes to cause excessive frictional forces between the piston and cylinder walls to be developed thus causing the pistons to stick. Such conditions result in the impartation of vibrations to the submarine hull which when silent running of the submarine is required is of course objectionable.

PRIOR ART

So far as is known, there are no prior patents disclosing the self-centering substantially frictionless hydraulic piston arrangement of this invention.

SUMMARY

According to the invention, a self-centering substantially frictionless hydraulic piston for doing useful work is comprised of two aligned cylinder sections containing a piston having two spaced apart piston sections complementary to the cylinder sections. Each piston section is provided with tapered side walls to form clearances with the cylinder walls from a piston end of minumum clearance to a piston end of maximum clearance. The fluid under pressure is applied to both of the piston section ends with maximum clearance and a controlled leakage of fluid under pressure between the cylinder walls in the direction from the points of maximum clearance to the points of minimum clearance with the cylinder walls for both piston sections is obtained to be effective to center the piston and enable it to remain centered in the presence of axially displaced forces resisting the piston thrust and tending to deflect the piston. Each piston section is rigidly connected to the other along the piston axis and in one form of the invention the directions of taper for the piston sections are opposite to each other and the fluid pressure is applied in the cylinder volume between the two spaced apart piston sections. The flow of hydraulic fluid in the clearance spaces of the self-centering pistons sections substantailly eliminates frictional contact between the piston sections and the cylinder walls except for fluid friction which may be ignored.

Other objects and advantages of the invention will be apparent with reference to the following specification and drawings in which, FIG. 1 is a diagrammatic view of a thrust bearing showing in section, the frictionless piston of the invention;

FIG. 2 is an enlarged fragmentary sectional view of a preferred form of the frictionless piston of the invention; and FIG. 3 is an enlarged fragmentary sectional view of a modified form of the invention.

DESCRIPTION OF THE PREFERRED EMBODIMENT

Figure 1:
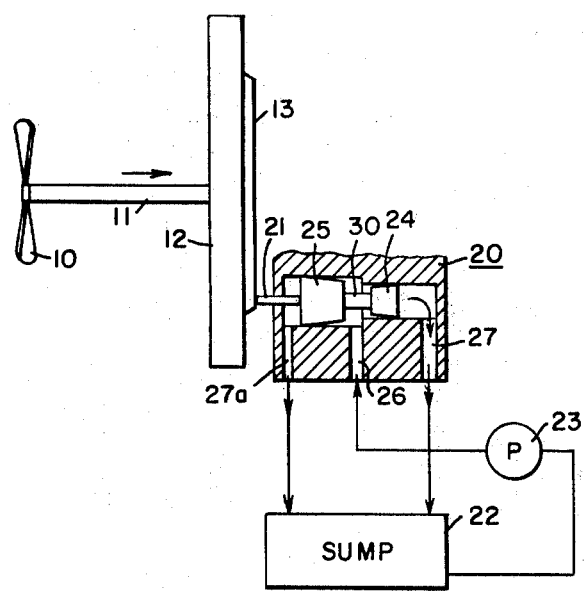
Figure 2:
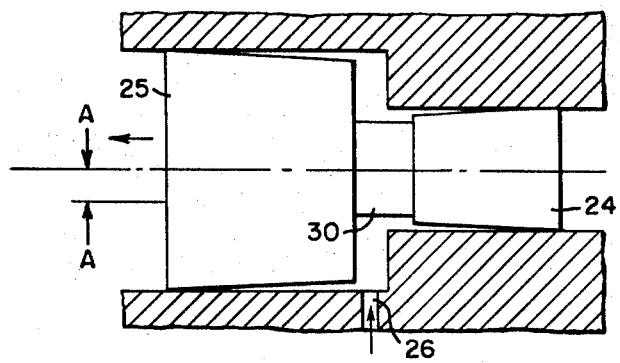

Referring to FIGS. 1 and 2 of the drawings, wherein the invention is diagrammatically shown as applied to a submarine thrust bearing, it should be understood that the many details of the thrust bearing are not shown since an understanding of such details is not necessary for a complete understanding of the present invention. It also should be understood that the frictionless hydraulic piston of the invention may be used for various applications other than a propeller thrust bearing and the invention is therefore not limited to such use. The propeller is shown at 10 to be connected by a shaft 11 to a thrust bearing plate 12 which may be a simple disc member or the like. The smooth thrust bearing surface 13 of the thrust bearing disc 12 revolves with the shaft 11 and propeller 10 and a plurality of hydraulic piston and cylinder arrangements such as the one generally shown at 20 are positioned radially offset around the shaft 11. The reaction thrust forces from the propeller 10 as shown by the direction of the arrow are resisted by the hydraulic pistons such as the hydraulic piston 20 through the connecting shoe arrangements such as the floating pin shown at 21 engaging the smooth thrust bearing surface 13.

It should be understood that the plurality of radially positioned hydraulic pistons such as the piston and cylinder arrangement shown at 20 are enclosed in a casing having an oil sump such as the sump diagrammatically shown at 22. Oil from the sump 22 is pumped by the pump 23 into the cylinder volume between the piston sections 24, 25 through an aperture such as the aperture 26. The leakage of oil flowing past the piston sections 24, 25 escapes through the apertures 27 and 27a back to the sump 22 as shown by the direction of the arrows. It has been found that in actual practice the thrust forces transmitted from the thrust bearing surface 13 through the floating connecting pins such as the connecting pin 21 actually tend to develop forces which are displaced from the axes of the piston sections 24, 25 due to the dragging frictional contact between the thrust plate surface 13 and the connecting pin 21. These axially displaced thrust forces, if applied to a conventional hydraulic piston would cause the piston to be deflected against the piston walls creating undesirable friction and causing sticking of the piston and vibrations of the bearing arrangement as previously described.

In accordance with the invention each spaced apart and axially aligned piston sections 24, 25 is provided with tapered wall surfaces extending from a piston end of maximum clearance to a piston end of minimum clearance with the cylinder walls. Since the piston section 25 is of larger diameter than the piston section 24, when fluid under pressure is supplied through the aperture 24 to the cylinder volume intermediate the two piston sections 24, 25, a net force is exerted by the piston section 25 towards the thrust bearing disc 12 to resist the thrust of the propeller 10. The tapered wall sections of the two piston sections 24, 25 are more clearly shown by FIG. 2 of the drawings wherein it will be seen that there are clearances along the entire length of the elongated piston sections 24, 25 tapering from a maximum clearance to a minimum clearance in the direction of fluid flow. These clearances provide for a controlled flow or leakage of hydraulic fluid along both piston sections 24, 25 in a manner to center the piston sections 24, 25 while exerting force by piston section 25 against an axially displaced force as indicated at AA on FIG. 2. In other words, both the tail piston section 24 and the main piston section 25 develop balancing and when the piston is tended to be deflected by external forces, it being understood that the piston sections 24, 25 are rigidly connected together by a connecting section 30 along their axes. The amount and degree of displaced deflecting forces that the hydraulic piston arrangement of the invention may resist while still remaining centered to provide an essentially frictionless operation is determined by the variable parameters of the system including the diameters of the piston sections, the relative lengths of the spaced apart piston sections, the ratios of maximum to minimum clearances and the amount of such clearances, the distance between the spaced apart piston sections, etc. Since these parameters are obviously a matter of design engineering, it is not believed necessary to detail any such parameters. For example, diameters for the piston sections 24, 25 is a matter of design choice depending primarily upon the amount of overall hydraulic effort to be exerted by the piston.

Figure 3:
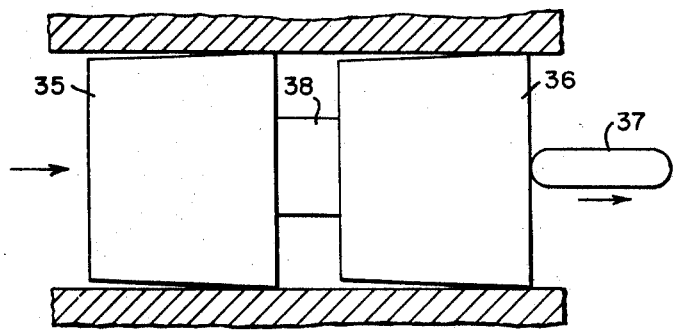

Referring to FIG. 3 of the drawing, a modified form of the invention is shown wherein the direction of taper for both spaced apart piston sections 35 and 36 is the same and the direction of fluid flow through the cylinder is from one end to the other. In this arrangement, useful work will be expended by the connecting pin 37 in the direction of the arrow when fluid under pressure is applied to the end of the piston section 35 having the maximum clearance which is shown to be at the left of the drawing. Due to the tapered clearances, a controlled hydraulic fluid leakage will be obtained around both the piston section 35 and the spaced apart piston section 36 to center the piston sections against reaction forces applied off-center and tending to deflect the pistons and useful work is obtained by the application of hydraulic fluid pressure in the direction of the arrow. Again it should be understood that the relative dimensions for the piston sections and their clearances are a matter of design engineering choice which will vary for a given application of the invention.

Various modifications will occur to those skilled in the art. For example although only two spaced apart piston sections have been shown, it should be understood that more than two spaced apart piston sections may be used if desired to obtain even stronger self-centering action for the piston within its cylinder environment. Also, instead of tapering the two piston section walls, the cylinder walls could be tapered to a decreasing clearance along the direction of fluid flow for a limited length relative to straight sided piston sections. Additionally instead of smooth tapered sides for the piston or cylinder walls stepped sections of different clearances would be used to effectively provide a tapered wall.

I claim:

1. A fluid pressure cylinder and piston arrangement in which the piston movement is self-centering to be substantially frictionless comprising, a cylinder having at least first and second aligned cylinder sections, one cylinder section having a larger effective diameter than the other cylinder section, a piston having at least first and second adjacent and rigidly connected spaced apart sections complementary in said first and second cylinder sections, one piston section having a larger effective diameter than the other piston section, at least one of the walls between each of said piston and cylinder sections being tapered in opposite directions from their adjacent inner spaced apart ends along their lengths from an inner piston section end of maximum clearance to an outer piston section end of minimum clearance, means connecting the outer ends of said cylinder adjacent the outer minimum clearance ends of the piston sections to a low pressure area, and means to supply fluid under pressure to the interior of said cylinder adjacent the piston spaced apart inner ends of maximum clearance to thereby exert a net force by the piston while providing fluid flow along the walls of both of the piston sections in the directions of their decreasing clearances to obtain a centering action for the piston sections and minimize frictional contact between the walls of the cylinder sections and the piston sections.